United States Patent [19]

Hayakawa

[11] Patent Number: 4,728,774

[45] Date of Patent: Mar. 1, 1988

[54] AUTOMATIC WELDING MACHINE CORRECTING FOR A VARIBLE GROOVE WIDTH

[75] Inventor: Yoshitaka Hayakawa, Aichi, Japan

[73] Assignee: Mitsubishi Denki Kabushiki Kaisha, Tokyo, Japan

[21] Appl. No.: 891,022

[22] Filed: Jul. 31, 1986

[30] Foreign Application Priority Data

Jul. 31, 1985 [JP] Japan ............................... 60-169016
Jul. 31, 1985 [JP] Japan ............................... 60-169017
Jul. 31, 1985 [JP] Japan ............................... 60-169018

[51] Int. Cl.[4] .............................................. B23K 9/12
[52] U.S. Cl. ........................... 219/124.22; 219/125.12; 219/130.5
[58] Field of Search ....................... 219/125.12, 124.34, 219/130.21, 130.5, 124.1, 124.22

[56] References Cited

U.S. PATENT DOCUMENTS

| 3,924,094 | 12/1975 | Hansen et al. | 219/124.34 |
| 4,151,395 | 4/1979 | Kushner et al. | 219/124.34 |
| 4,336,440 | 6/1982 | Cook et al. | 219/124.34 |
| 4,380,695 | 4/1983 | Nelson | 219/124.34 |
| 4,491,718 | 1/1985 | Cook et al. | 219/125.12 |
| 4,621,185 | 11/1986 | Brown | 219/124.34 |

FOREIGN PATENT DOCUMENTS

| 3103016 | 8/1982 | Fed. Rep. of Germany . |
| 3144155 | 5/1983 | Fed. Rep. of Germany . |
| 3226418 | 1/1984 | Fed. Rep. of Germany . |
| 3403054 | 8/1984 | Fed. Rep. of Germany . |
| 3313230 | 10/1984 | Fed. Rep. of Germany . |
| 59-193770 | 2/1984 | Japan . |
| 1388877 | 3/1975 | United Kingdom . |

OTHER PUBLICATIONS

German Publication "Einsata von Prozessrechnern in der Schweisstechnik", 7/1972.

Primary Examiner—Clifford C. Shaw
Attorney, Agent, or Firm—Sughrue, Mion, Zinn, Macpeak, and Seas

[57] ABSTRACT

An automatic welding machine which welds two materials separated by a groove that may be of varying cross-section along its length. Cross-sections at the two ends of the welding line are input by a variety of means. The machine then calculates an oscillating welding pattern along the groove so as to deposit a constant density of weld material.

7 Claims, 17 Drawing Figures

| ADDRESS | | |
|---|---|---|
| 0H | I | CODE 00 |
| 1H | V | 01 |
| 2H | F | 02 |
| ⋮ | ⋮ | ⋮ |
| 14H | $\ell_{10}$ | CODE 20 |
| 15H | $\ell_{11}$ | 21 |
| 16H | $\ell_{12}$ | 22 |
| 17H | $\ell_{13}$ | 23 |
| 18H | $\ell_{20}$ | 24 |
| 19H | $\ell_{21}$ | 25 |

AUTOMATIC WELDING MACHINE CORRECTING FOR A VARIBLE GROOVE WIDTH

BACKGROUND OF THE INVENTION

1. Field of the Invention

This invention relates to an automatic welding machine for arc-welding materials such as steel frames which have a straight welding line and form a welding groove.

2. Background Art

Recently, automating of arc welding is progressing. On the other hand, butt welding of straight parts or welding of multiple layers of materials forming a welding groove are relatively simple, and it has been considered that the automation of these operations can be readily achieved. However, in butt welding or in multi-layer welding, the gap of the welding groove is seldom performed with high accuracy in the track welding of materials. This fact obstructs the automating of the welding operation.

Figure 11:
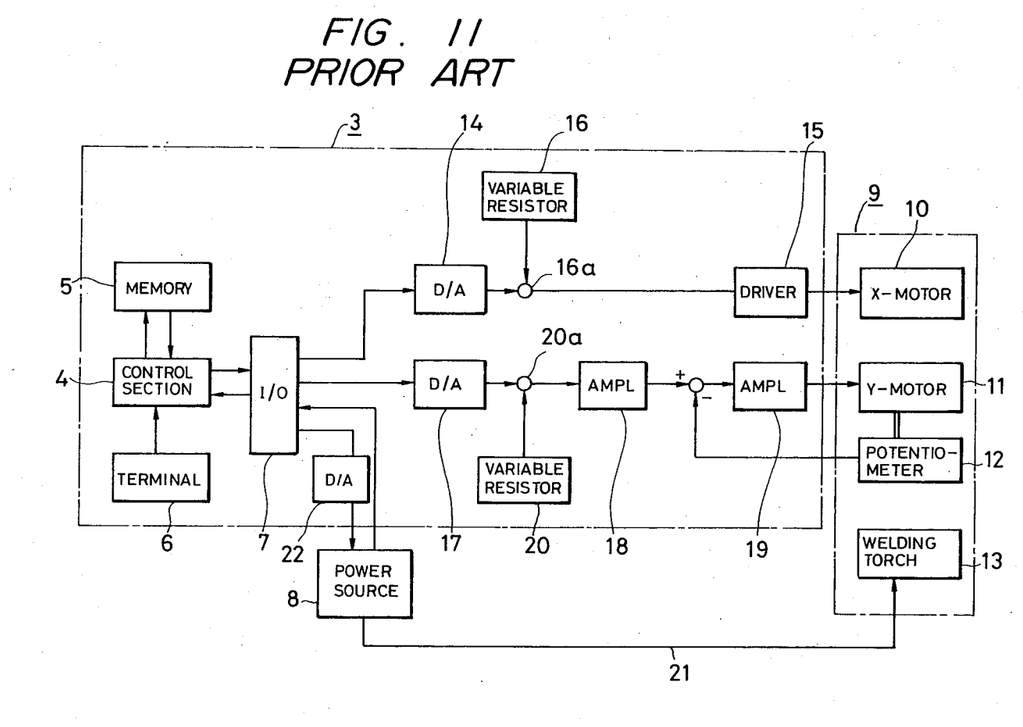
FIG. 11 is a block diagram showing the electronic arrangement of a conventional automatic welding machine.
Figure 12A:
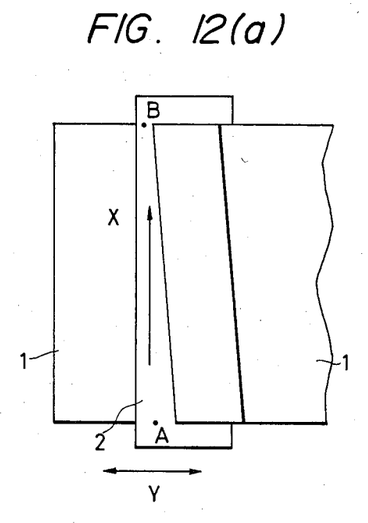
FIG. 12(a) is a plan view showing an example of materials to be welded, respectively.
Figure 12B:
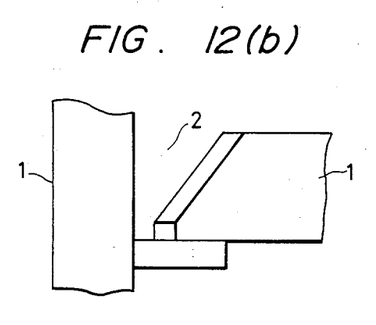
FIG. 12(b) is a front view of FIG. 12(a).

A conventional automatic welding machine of this type is as shown in FIG. 11. FIGS. 12(a) and 12(b) are respectively a plan view and a front view showing one example of materials to be welded. In FIG. 12 are shown pieces 1 to be welded and a welding groove 2 between them. Further in FIG. 12(a), the welding direction is indicated by an arrow X, and the welding groove direction is indicated by an arrow Y.

In FIG. 11 is shown a block diagram of a control unit which is the center of the welding machine. It includes a control section 4 having a CPU (central processing unit) as its center and a memory section 5 for storing various data, the memory section 5 comprising a RAM (random access memory). Connected to the control section 4 are a welding condition setting section or terminal 6 made up of a keyboard and a data displaying unit and an input/output circuit 7 for transmitting data between the control section 4 and external equipment. A welding power source 8 is connected to the control section 4 through the input/output circuit 7, and supplies power to a welding head 9. The welding head 9 includes an X-axis drive motor 10 for moving the welding head 9 in the welding direction, a Y-axis drive motor 11 for moving the welding head 9 in the groove width direction, a potentiometer 12 whose phase changes with rotation of the Y-axis drive motor 11, and a welding torch 13.

Further in FIG. 11, a D/A (digital-to-analog) converter 14 converts a digital welding speed instruction value supplied by the control section to an analog value, which is given to the X-axis drive motor 10 through a motor drive circuit 15. A D/A converter 17 converts a digital oscillation pattern instruction value, supplied by the control section 4, to an analog value, which is supplied through amplifiers 18 and 19 to the Y-axis drive motor 11.

Fine control variable resistors 16 and 20 provide offset signals to respective adders 16a and 20a for the welding speed instruction value and the oscillation pattern instruction value, which have been subjected to digital-to-analog conversion. The offset signals may be derived from variable center taps of potentiometers, whose fixed end terminals are connected to positive and negative voltage sources. The input/output circuit 7 supplies a welding current value instruction to the welding power source 8 through a D/A converter 22 and it receives from the welding power source 8 an arc detection signal on a separate line.

The welding power source 8 is connected through a power cable 21 to the welding torch 13. The Y-axis drive motor 11 is so arranged as to be able to move the welding torch 13 in the width direction of the groove, while the X-axis drive motor 10 is so arranged as to be able to move the welding head 9 in the welding direction.

The operation of the machine thus organized will now be described.

Before starting a welding operation, the operator operates the terminal 6 to enter and set data for various conditions for the welding operation. The welding conditions are, for instance, a welding current, a welding speed, an oscillation width and an oscillation traversal time. The welding conditions are set by using the keyboard. The data, thus set, are applied through the control section 4 to the memory section 5, where they are stored in the RAM.

When a welding starting instruction is supplied to the control section 4 from the terminal 6, the control section 4 starts controlling the welding head 9 and the welding power source 8 according to the welding sequence.

The preset welding speed is read out of the memory section 5, and is applied through the input/output circuit 7 to the D/A converter 14, where it is converted into an analog value. The analog value is applied to the motor drive circuit 15, so that the X-axis drive motor 10 is driven to move the welding head 9 in the welding direction. The fine control variable resistor 16 is provided so that, during welding, the operator can adjust the welding speed with respect to the set value while observing the conditions of arcs. That is, the operator can suitably increase or decrease the welding speed.

In the case where the width of the welding groove is large to some extent, the welding torch 13 is oscillated in the groove width direction. For this purpose, an oscillation width, an oscillation traversal time, and both end stop times are set by using the welding terminal 6 similarly as in the case of setting a welding speed. The oscillation pattern is determined by the three conditions thus set.

The output instruction value of the oscillation pattern is calculated as position data after the control section 4 reads the three conditions from the memory section 5. The instruction value thus processed is outputted as position data for the Y-axis with respect to the time axis by the control section 4. The instruction value outputted by the control section 4 is supplied through the input/output circuit 7 to the D/A converter 17, where it is converted into an analog value.

The analog value is applied to the Y-axis drive motor after being amplified by the amplifiers 18 and 19.

On the other hand, the Y-axis drive motor 11 is coupled to the potentiometer 12, thus forming a conventional servo system. A difference signal representing the difference between the oscillation pattern output instruction value and the output voltage of the potentiometer 12 is produced by comparison and then amplified by amplifier 19. The signal thus processed drives the Y-axis drive motor 11 in such a manner as to eliminate the difference. The fine control variable resistor 20 is provided so that, during welding, the operator can finely adjust the oscillation width while observing the welding groove width and the arcing conditions. That is, the operator can suitably increase or decrease the oscillation width during welding.

The set welding current value, read out of the memory section 4, is applied through the input/output circuit 7 and the D/A converter 22 to the welding power source 8 to determine the welding current.

In the case where, as shown in FIG. 12, the welding groove width at the starting point of the welding is different from that at the ending point, it is necessary for the operator to adjust the oscillation width and the welding speed with the fine control variable resistors 16 and 20 at all times. And the fine adjustment is liable to include personal operator errors. Therefore, automatic control of the welding operation is not at all practical in this case.

SUMMARY OF THE INVENTION

In view of the foregoing, an object of this invention is to provide an automatic welding machine in which, even in the case where welding groove widths at both ends of a welding line are different from each other, welding conditions are automatically corrected to control the amount of weld deposition to thereby make the weld reinforcement uniform in height. Thus, the welding operation can be automatically achieved.

The foregoing object of the invention has been achieved by the provision of an automatic welding machine including an oscillating welding head of the self-running type for arc-welding materials which form a welding groove. According to the invention, the welding machine includes an input section for setting and inputting predetermined welding conditions for both a predetermined position of the materials and welding groove data at both ends of a welding line of the materials. The welding groove data are required for correcting some welding conditions according to the variation in groove width or groove cross-sectional area of the materials. There is also provided a teaching section for teaching the positions of both ends of the welding line of the material. A correcting section utilizes data which have been set and inputted by the input section and which have been taught by the teaching section in order to automatically correct some welding condition according to the variation in groove width or groove sectional area of the materials.

DETAILED DESCRIPTION OF THE PREFERRED EMBODIMENTS

Figure 1:
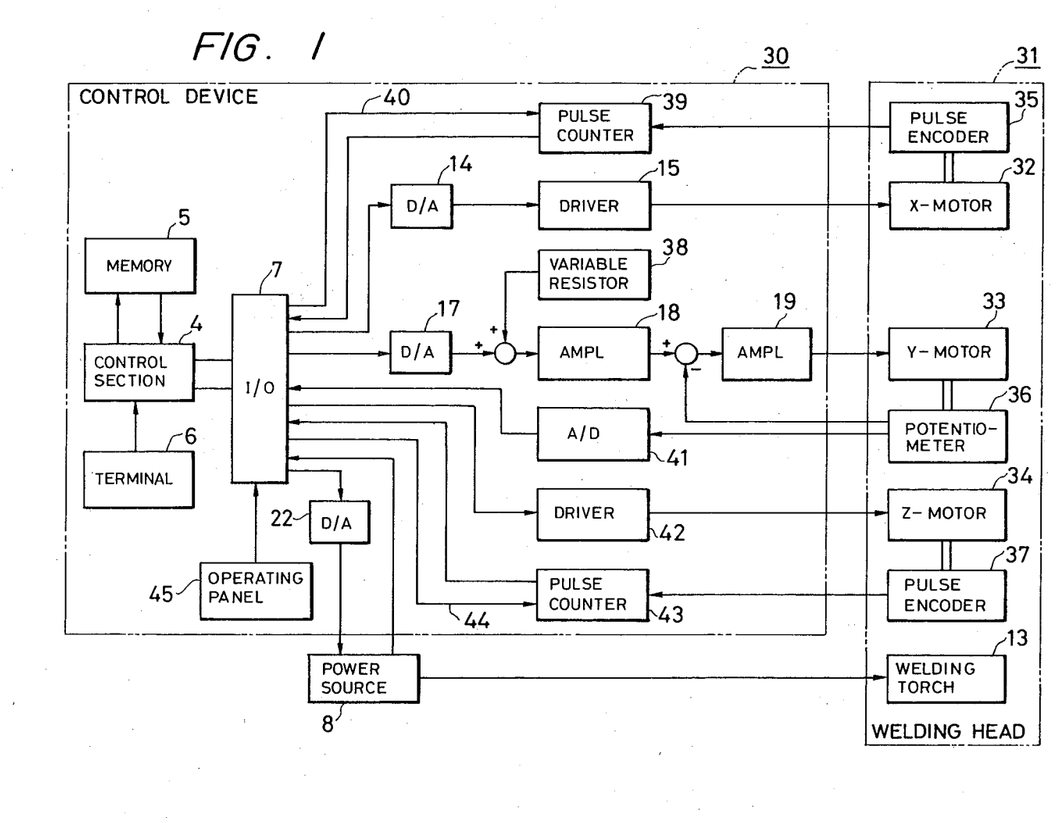
FIG. 1 is a block diagram showing the electrical arrangement of one embodiment of the invention.
Figure 2:
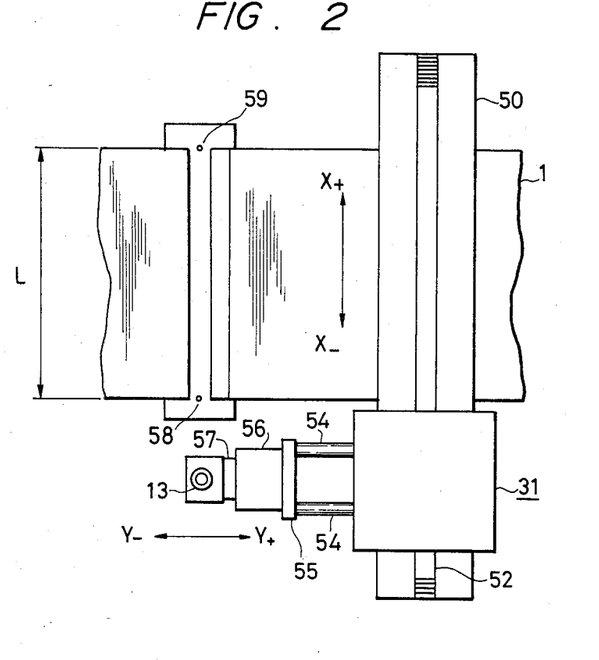
FIGS. 2 and 3 are a plan view and a side view showing the positional relationships between a welding head and materials to be welded.
Figure 3:
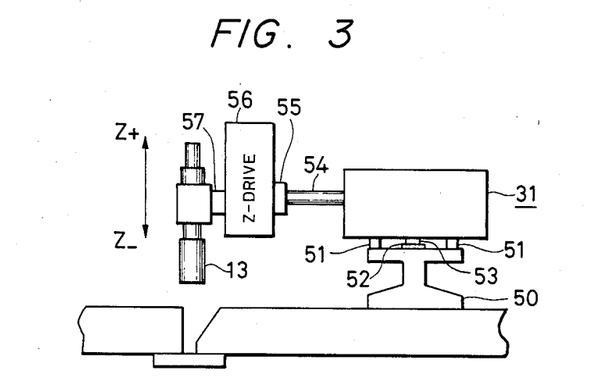
Figure 4A:
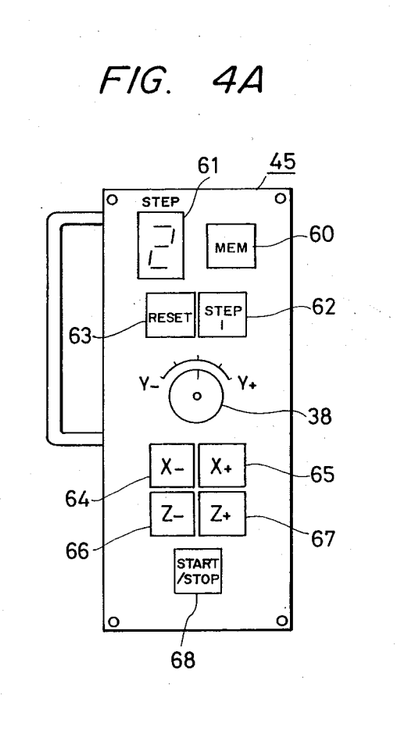
FIGS. 4A, 4B and 4C are front views of different operating panels.
Figure 4B:
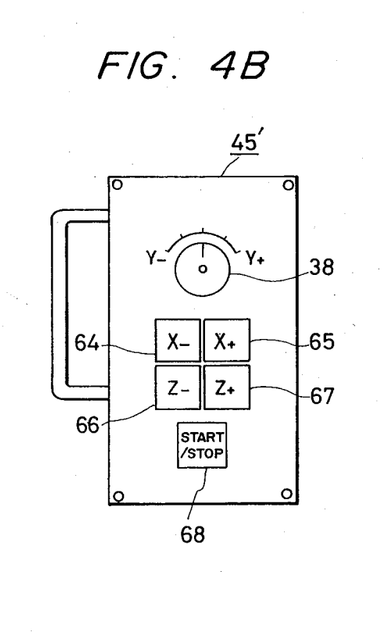
Figure 4C:
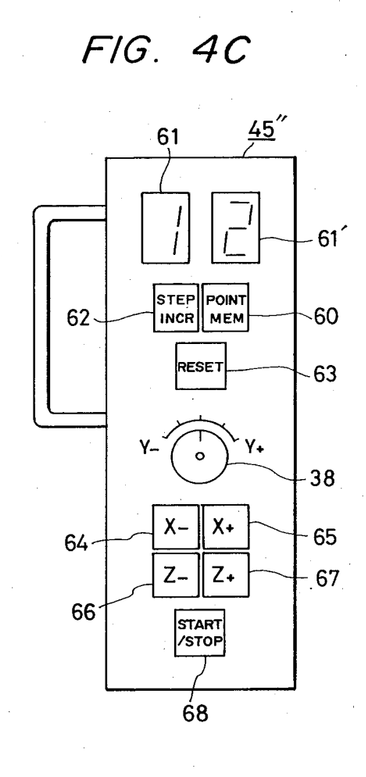

One embodiment of this invention will be described with reference to the accompanying drawings. FIG. 1 is a block diagram showing the arrangement of an automatic welding machine which is one embodiment of the invention. FIGS. 2 and 3 are a plan view and a side view showing the positional relationships between materials to be welded and the welding head of the welding machine, respectively. FIG. 4 shows the operating section of the welding machine.

In FIG. 1, parts corresponding functionally to those already described with reference to FIG. 11 are designated by the same reference numerals or characters.

In FIG. 1, a control device 30 is the center of the automatic welding machine and controls a welding head 31 of the welding machine. The welding head 31 has three orthogonal drive mechanisms, namely, an X-axis drive motor 32 for moving the welding head 31 in the welding direction, a Y-axis drive motor 33 for moving it in the groove width direction, and a Z-axis drive motor 34 for moving the welding torch 13 vertically. These drive mechanisms are provided with respective position detectors. A pulse encoder 35 is coupled to the X-axis drive motor 32, a potentiometer 36 is coupled to the Y-axis drive motor 33, and a pulse encoder 37 is coupled to the Z-axis drive motor 34, is such a manner that their outputs change with rotation of the motors.

A crosswise adjustment variable resistor 38 feeding an adder is used for moving the whole Y-axis stroke and is provided between the D/A converter 17 and the amplifier 18 of the Y-axis driving circuit.

The X-axis pulse encoder 35 is connected to a pulse counter 39, the reset terminal of which is connected through a counter reset signal line 40 to the input/output circuit 7.

Similarly as in the conventional welding machine described above, the Y-axis potentiometer 36 forms a servo system, and its position data is applied through an A/D converter 41 to the input/output circuit 7.

In response to a rotation instruction from the control section 4, a drive circuit 42 drives the Z-axis drive motor 34 so that the motor 34 rotates at a constant speed. Similarly as in the case of the X-axis pulse encoder, the Z-axis pulse encoder 37 is connected to a pulse counter 43, which is connected through a counter reset signal line 44 to the input/output circuit 7.

In order to execute a variety of instructions, any of operating panels 45, 45' and 45" shown in FIGS. 4A, 4B and 4C is coupled to the input/output circuit 7. The crosswise adjustment variable resistor 38 is provided in each of the operating panels.

In FIGS. 2 and 3, a guide rail 50 guides the welding head 31, the rail 50 being secured to one of the pieces 1 to be welded. Four running wheels run on the guide rail 50 to move the welding head 31 in the X-axis direction. A rack 52 is formed on the guide rail 50 and a pinion gear 55 which is driven by the rotary shaft of the X-axis drive motor 32 of the welding head 31 and which engages the rack 52 to move the welding head 31 in the X-direction.

Further in FIGS. 2 and 3, a pair of guide bars 54 are slid in the Y-axis direction by the Y-axis drive motor 33 of the welding head 31. A Z-axis drive mechanism 56 is secured through a mounting fixture 55 to the ends of the guide bars 54.

A slide block 57 is vertically movable by the X-axis drive mechanism 56. The welding torch 13 is connected to the slide block 57.

In FIG. 2 are shown a welding starting point 58 and a welding ending point 59.

As shown in FIG. 4A, a "MEMORY" switch 60 is used to initiate the storing of the position data of the tip of the welding torch 13. An LED (light emitting diode) 51 displays the step number of the position data. A "STEP 1" switch 62 initiates the return of the welding torch 13 to the step number "1" position. A "RESET" switch is used for resetting the X-axis pulse counter 39 and the Z-axis pulse counter 43. Inching switches 64 and 65 are used for moving the welding head 31 forwardly and backwardly along the X-axis. Similar inching switches 66 and 67 are used for moving the welding torch 13 upwardly and downwardly along the Z-axis. The welding torch 13 is moved towards the welding head 31 by turning the crosswise adjustment variable resistor 38 clockwise, and the welding torch 13 is moved away from the welding head 31 by turning the variable resistor 38 counterclockwise.

Further in FIG. 4A, a switch 68 effectively provides a welding start instruction and a welding stop instruction.

The construction of the alternative operating panels will be described later.

The operation of the automatic welding machine thus constructed will be described. Before starting a welding operation, the operator sets welding condition data, and teaches a welding starting point and a welding ending point to the welding machine.

Figure 6:
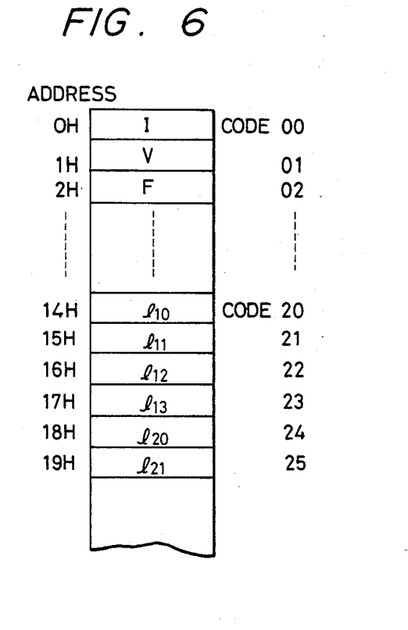
FIG. 6 is an explanatory diagram showing the internal storage format of a memory section.

The welding conditions are set with the terminal in FIG. 1. As all the welding conditions have been encoded, setting of the data is carried out after code numbers are specified. The input data are applied through the control section 4 to the memory section 5, where they are stored in the RAM. A part of the internal storage area of the memory section 5 is arranged as shown in FIG. 6. In FIG. 6, data locations are shown for a welding current I, a welding voltage V and a welding speed F. These data and other data such as oscillation width and an oscillation traversal time are encoded and stored in the storage area. It should be noted that the data set are the welding conditions at the welding starting point 58.

Figure 5:
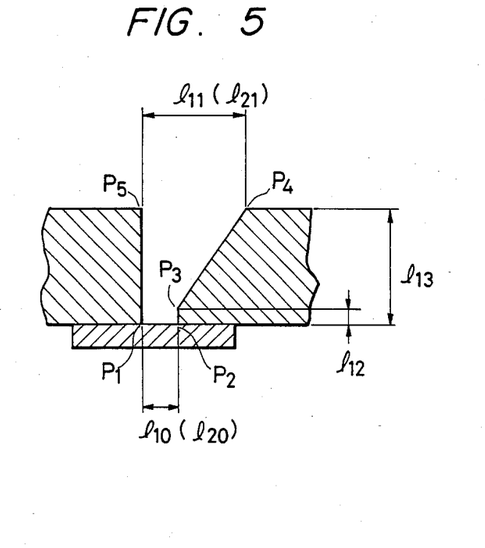
FIG. 5 is a diagram showing welding groove dimensions to be measured.

In addition, the operator measures the dimensions of the welding groove of the materials to be welded, and sets them with the terminal 6 similarly to the setting of the above-described welding conditions. The dimensions of the welding groove are measured both at the welding starting point 58 and at the welding ending point 59. The dimensions to be measured are, as shown in FIG. 5, a base gap $l_{10}$, an upper side $l_{11}$, a base level $l_{12}$, and a plate thickness $l_{13}$, all on the side of the welding starting point 58. Similar dimensions on the side of the welding ending point 59 are a base gap $l_{20}$ and an upper side $l_{21}$. The base level $l_{12}$ and the plate thickness $l_{13}$ are measured on one side only because generally they are not varied by machining.

These dimensions are encoded, as was described before, and the dimensions thus encoded are stored in the memory section 5 as shown in FIG. 6.

Teaching of the positions of the welding starting point 58 and the welding ending point 59 is carried out as follows. First, the X- inching switch 64 is depressed to position the welding torch 13 slightly in front of the welding starting point 58, that is, on the side away from the ending point 59. The "Z-" switch 66 is operated to move the welding torch 13 downwardly until the tip of the welding torch 13 is positioned below the bottom of the welding groove. Thereafter, the "RESET" switch 63 is depressed. As a result, the X-axis pulse counter 39 and the Z-axis pulse counter 64 are reset through the reset signal lines 40 and 44, respectively, and the step number LED 61 displays "0". The "X+" switch 65, the "Z+" switch 67, the "Z−" switch 66 and the crosswise adjustment dial 38 are suitably operated to move the welding torch 13 to the welding starting point 58. When the welding torch 13 is positioned at the welding starting point 58, the "MEMORY" switch 60 is depressed. As a result, the LED 61 displays "1", and the position data at this position are stored in the memory section 5. The position data thus stored are produced as follows. As the X-axis drive motor 32 rotates, the pulse encoder 35 outputs a pulse signal, and the pulse counter 39 counts the number of pulses after being reset. The count value of the pulse counter 39 is stored in the memory section 5 through the input/output circuit 7 and the control section 4 upon depression of the "MEMORY" switch 60. As for the Z-axis, the number of pulses counted is stored in the same manner. However, the storing of the number of pulse for the Z-axis is similar but will not be described in detail, being not directly related to the present invention.

Next, after the welding head 31 is positioned at the welding ending point 59, just as in the case of positioning it at the welding starting point 58, the "MEMORY" switch 60 is depressed. As a result, the LED 61 displays "2". The position data at this position is stored, as a "step 2" position, in the memory section 5.

Thus, the welding conditions have been set, and the teaching of the positions of the welding starting point 58 and the welding ending point 59 has been accomplished. The welding head is moved to the welding starting point 58. This operation can be achieved by depressing the "STEP 1" switch. As a result, the welding head 31 and the welding torch 13 are automatically returned to the welding starting point 58 (Step "1"), while the LED 61 displays "1" again.

Under this condition, the operator depresses the "WELDING START/STOP" switch 68 so that the welding torch 13 starts a welding operation. The instruction from the "WELDING START/STOP" switch is applied through the input/output circuit 7 to the control section 4. The control section 4, after decoding that the instruction is to start a welding operation, reads the necessary welding conditions sequentially from the memory section 5, and starts calculations for controlling the welding head 31 and the welding power source 8. Of the calculations, only those which concern the invention will be described in detail.

Figure 8A:
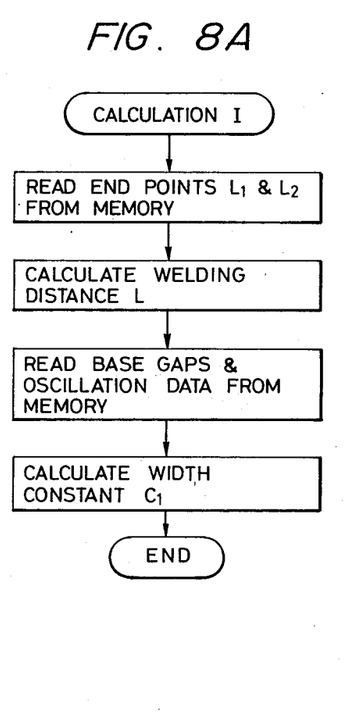
FIGS. 8A, 8B and 8C are flow charts indicating a preliminary oscillation calculation.
Figure 9:
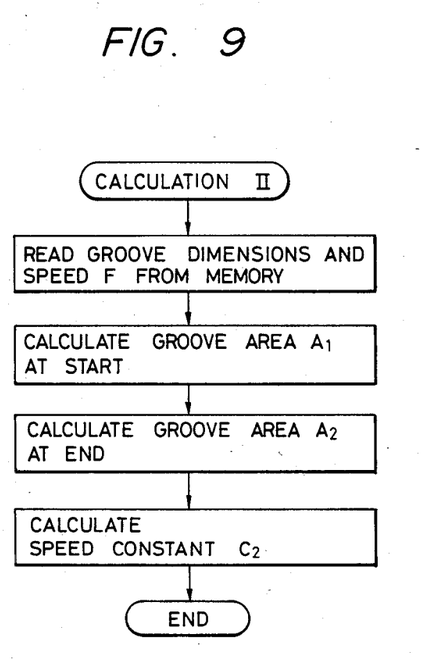
FIG. 9 is also a flow chart indicating a preliminary welding speed calculation.

The preliminary calculation at the start of welding are as outlined in FIGS. 8A and 9. In Calculation I, a preliminary calculation for oscillation is carried out. In Calculation II, a preliminary calculation for welding speed is carried out.

In Calculation I, first the position data of the welding starting point 58 and the welding ending point 59 are read from the memory section 5 by the control section 4. The welding distance L is $$L = L_2 - L_1$$

where $L_1$ is the position of the welding starting point (Step 1) in the x-axis direction, and $L_2$ is the position of the welding ending position in that same direction (Step 2).

Next, the base gaps $l_{10}$ and $l_{20}$ at the welding starting point 58 and the welding ending point 59, and the oscillation width W are read out of the memory section 5. Since it is necessary to change the oscillation width in proportion to the change of the groove width which is caused during the welding operation, the oscillation width at the welding ending point 59 is:

$$W \cdot l_{20}/l_{10}.$$

As was described before, the oscillation width W set is for the welding starting point 58.

Therefore, the difference between the oscillation width at the welding ending point 59 and that at the welding starting point 58 is:

$$W \cdot (l_{20}/l_{10} - 1).$$

If it is assumed that the distance of a given point from the welding starting point 58 is represented by $L_n$, then the oscillation width at the given point is:

$$W + W \cdot (l_{20}/l_{10} - 1) \cdot L_n/L = W \cdot (1 + (L_n/L) \cdot l_{20}/l_{10} - 1)).$$

This expression can be rewritten as follows:

$$W \cdot (1 + C_1 \cdot L_n) \qquad (B)$$

where $$C_1 = (l_{20}/l_{10} - 1)/L \qquad (A)$$

In the constant calculation of Calculation I, $C_1$ is obtained according to the expression (A) and is stored in the memory section 5.

Upon completion of Calculation I, the control section 4 performs Calculation II. In Calculation II, first the groove dimensions at the welding starting point 58 and the welding ending point 59, and the welding speed F are read out of the memory section 5. Since the groove dimensions are measured as shown in FIG. 5, the control section 4 can readily calculate the groove cross-sectional area $A_1$ at the welding starting point 58 and the groove area $A_2$ at the welding ending point 59.

In a consumable electrode welding method, the amount of deposition at a given position in the welding direction is inversely proportional to the welding speed as long as the welding current is constant. The amount of deposition should be proportional to the change of the groove cross-sectional area which is caused during the welding operation. Therefore, the welding speed at the welding ending point 59 is $$F \cdot A_1/A_2$$

where $A_1$ and $A_2$ are the cross-sectional areas at the starting point 58 and the ending point 59. These values are calculated from the dimensions 1 in well known ways. Therefore, the difference between the welding speed at the welding ending point 59 and that at the welding starting point 58 is:

$$F \cdot (A_1/A_2 - 1).$$

Furthermore, the welding speed at the given point which is at the distance $L_n$ from the welding starting point 58 is $$F + F \cdot (A_1/A_2 - 1) \cdot L_n/L = F \cdot (1 + (L_n/L) \cdot (A_1/A_2 - 1)).$$

This expression can be rewritten follows:

$$F(1 + C_2 \cdot L_n) \qquad (D)$$

where $$C_2 = (A_1/A_2 - 1)/L \qquad (C)$$

In the constant calculation of Calculation II, $C_2$ is obtained according to the expression (C) and is stored in the memory section 5.

Thus, the control section 4 has accomplished the preliminary calculations, and perform the control of the external equipment.

On the other hand, during welding the control section 4 should control the welding speed, the oscillation pattern, the welding current, etc. in a real time mode. For this purpose, it is necessary to employ a control program called an operating system (OS). Some usable operating systems are commercially available. A description of the operating system will not be presented, because it is not directly related to the invention.

Figure 7:
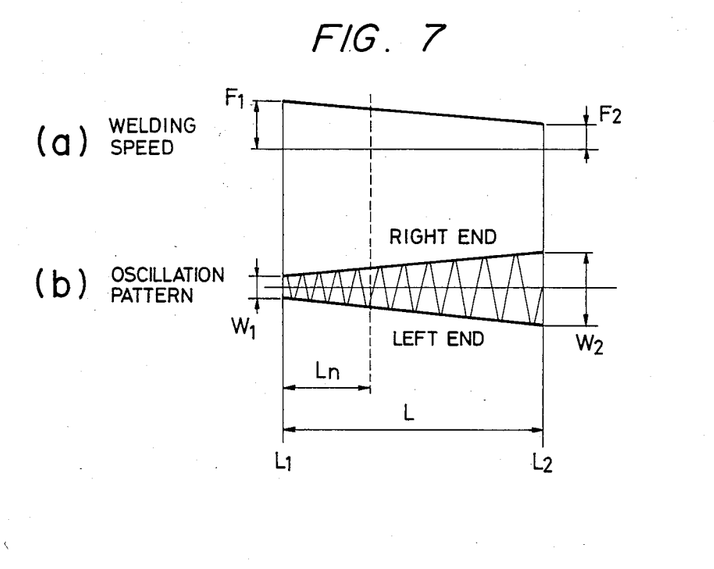
FIG. 7 is an illustration of the variation of welding speed and an oscillation pattern along a groove.
Figure 10:
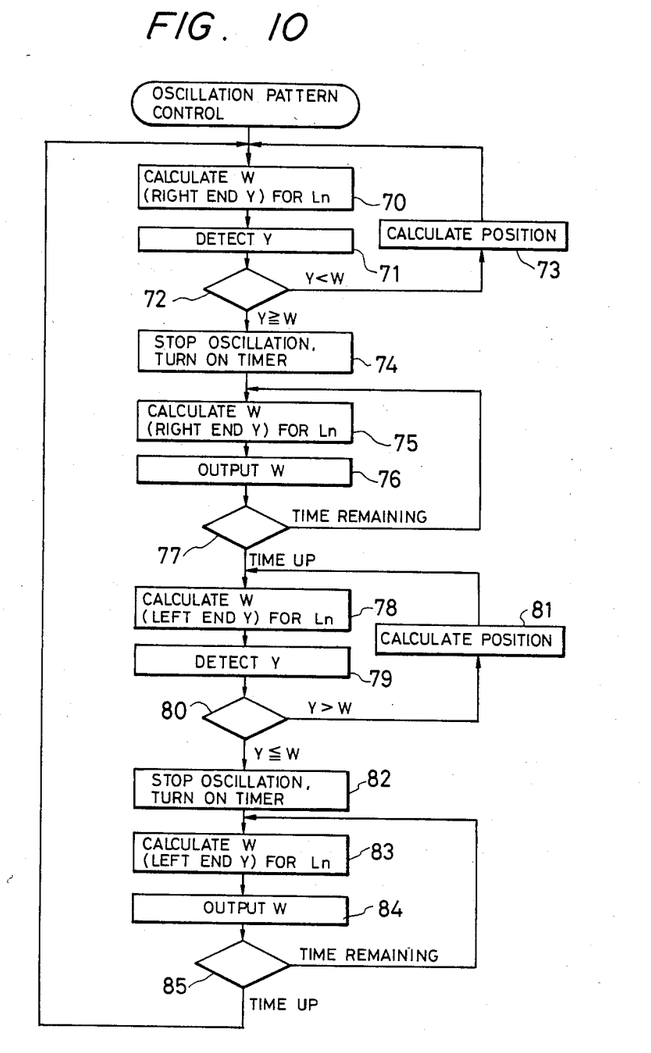
FIG. 10 is flow chart for control of the oscillation pattern.

FIG. 7 shows how the welding speed and the oscillation pattern are controlled with respect to the change of the welding groove width. FIG. 10 is a flow chart for the control of the oscillation pattern.

Of the output controls, the oscillation pattern control will be described first. In this connection, it should be noted that, in the flow chart of FIG. 10, only operations concerning the oscillation pattern control are described sequentially, and in practice these operations together with other tasks are carried out in a real time mode according to the aforementioned operating system.

In the initializing operation, which is carried out before a welding operation, the data of the midpoint of the oscillation width is applied from the control section 4 to the Y-axis controlling D/A converter 17. When the output data is larger than the data for the midpoint data, the welding torch 13 is moved to the right (towards the welding head 31). When the output data is smaller than the midpoint data, the welding torch 13 is moved to the left (away from the welding head 31).

After the above-described Calculations 1 and II have been accomplished in response to the welding start instruction, in the oscillation control task the following preliminary calculation is carried out. An oscillation movement $\Delta W$ per fixed period is obtained from the oscillation width and the oscillation traverse time which have been set. The term "fixed period" as used here is intended to means the execution time interval between one execution of the oscillation control task and the next. Therefore, if the data $\Delta W$ is added to or subtracted from the output data for every execution time interval, then the Y-axis drive servo system can move the welding torch 13 to the right or to the left at a predetermined speed.

In the embodiment, the execution time interval is set to 20 ms.

As shown in FIG. 10, simultaneously with the start of operation, in Step 70 the present X-axis pulse count value is read, an oscillation width W is calculated according to the above-described expression (B), and the Y-axis position of the right end of oscillation to be reached is obtained from the result of the calculation. In Step 71, the present Y-axis position is read through the A/D converter 41 in FIG. 1, and is compared with the aforementioned Y-axis position to be reached. In Step 72, it is determined whether or not the present Y-axis position reaches the desired Y-axis position. If the present Y-axis position has not yet reached the desired Y-axis position, in Step 73 the data ΔW is added to the present Y-axis output data, and Step 70 is effected again. If the present Y-axis position equals or exceeds the desired Y-axis position, then Step 74 is executed. In Step 74, a timer is turned on according to the oscillation stop period which has been set. In Step 75, the present X-axis pulse value is read, an oscillation width is calculated according to the aforementioned expression (B), and similarly as in the case of Step 70 the Y-axis position of the right end of oscillation to be reached is obtained according to the result of the calculation. In Step 76, the Y-axis position thus obtained is outputted as a Y-axis output data so that the operation of the welding torch is in conformance to the change of the welding groove width during the oscillation stop period. In Step 77, it is determined whether or not the oscillation stop period has passed. If the oscillation stop period has not passed yet, Step 75 is carried out again. In the case where the oscillation stop period has passed, Step 78 is executed. In Step 78 and the following steps, the welding torch 13 is moved to the left end of the oscillation. The control is fundamentally the same as that which is carried out in Steps 70 through 77.

In Steps 70, 75, 78 and 83, control is so made that the present X-axis pulse count is compared with the X axis pulse count value of the welding ending point 59. When the values coincide, the welding torch is moved to the midpoint of the oscillation width.

Thus, according to the above-described output control, the oscillation pattern can be varied over the entire welding distance L according to the change of the welding groove width as shown in the part (b) of FIG. 7.

Now, the welding speed control will be described.

The welding speed at a given point in the welding direction can be obtained according to expression (D). During welding, in the welding speed control task, the control section 4 reads the present X-axis pulse count value and calculates a welding speed corresponding to the present groove cross-sectional area according to expression (D). This calculated welding speed is applied to the D/A converter 4 through the input/output circuit 7. As a result, the welding speed can be changed according to the groove cross-sectional area over the entire welding distance L as shown in the part (a) of FIG. 7.

In the above-described embodiment, the measured values of the welding groove dimensions at both ends of a welding line are inputted. However, the same effect can be obtained by employing a method in which the operator calculates the welding groove sectional areas by using the aforementioned measured value. In this modification, the cross-sectional areas $A_1$ and $A_2$ are directly inputted through the terminal 6.

All of the measured values are distances. However, in the case where a groove angle is formed as in the above-described embodiment, a system may be employed in which a groove angle is also inputted.

In this case, the memory switch 60, LED 61, the stop-1 switch 62 and the reset switch 63 of the operating panel of FIG. 4A may be omitted as shown by an operating panel 45' in FIG. 4B. In the case of FIG. 4B, a distance L between the start point 58 and the end point 59 is measured. The distance L, i.e., the welding length, is also coded and an actual value thereof is set by selecting the proper code number on the terminal 6 as in the case of the welding conditions, the gap size and the welding length L are completed.

First, the operator depresses the X— inching switch 64 to move the head 31 to the welding start point 58. Then the head in properly positioned with respect to the welding start point 58 by controlling the vertical movement of the torch 13 by means of the Z— or Z+ switch 66 or 67 and by controlling the lateral movement by means of the variable resistor 38.

Then the operator depresses the START/STOP switch 68 to start the welding operation of the torch 13. An instruction from the switch 68 is supplied through the input/output circuit 7 to the control section 4, in which it is recognized as the welding start signal through the respective reset signal lines 40 and 44 to the counters 39 and 43, to thus clear the contents of the counters 39 and 43. Therefore, the X counter 39 counts the number of pulses corresponding to the welding length while the head 31 is moving along the welding direction.

Figure 8B:
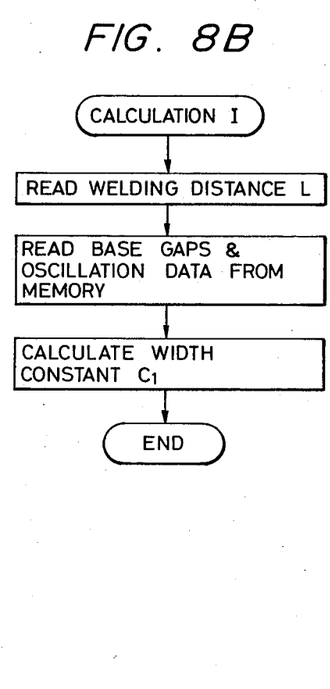

In this case, Calculation I is performed according to a flow chart shown in FIG. 8B. That is, the welding length L is first read out from the memory section 5. The subsequent operation of this case are the same as those described previously.

In FIG. 4C is shown an operating panel 45" with which the end dimensions are taught. The operating panel 45" includes a step switch 62, a point memory switch 60, an LED 61 for displaying the step number and an LED 61' for displaying the point number. In this case, the respective inching operations are stopped at a position where the tip of the welding wire of the welding torch 13 contacts with a point $P_1$, shown in FIG. 5, at the starting point 58. Then the step switch 60 is depressed, resulting in the LED 61 displaying a "1". Thereafter, the point memory switch 60 is depressed to cause the LED 61' to display a "1". Information regarding this indexed is stored in the memory 5. The position information is the content of the pulse counter 39, which has counted the number of pulses sent from the pulse encoder 35 after the counter 39 is reset due to the rotation of X motor 32.

The same operation are performed for the Z axis. That is, the pulse encoder 37 produces pulse signals due to the rotation of the Z motor 34 and the pulse counter 34 counts the pulses after reset. Upon depressing the switch 60, the content of the counter 34 is sent through the input/output circuit 7 and the control section 4 to the memory 5.

For the Y-axis, the current information of the potentiometer 36 is sent through the A/D converter 41 and the input/output circuit 7 to the memory 5.

Then, the torch 13 is moved to a point $P_2$ by the inching operation and after the torch 13 is positioned in the similar manner as for the point $P_1$, the switch 60 is again depressed. Therefore, the LED 61' displays a "2"

and the position information for the second point is stored in the memory 5 as the welding start point 58, i.e., the position of point 2 in step 1.

The above operation are performed for each of points $P_3$, $P_4$ and $P_5$ to teach the respective points. Then, the welding head 31 and the torch 13 are moved to the point $P_1$ of the ending point 59 and the step switch 60 is depressed to cause the LED 62 to display a "2". Then, the points $P_1$–$P_5$ are taught in the same way for the end point 59 as for the welding start point 58. Thus, the setting of the welding conditions and the teaching of the position of the respective cross points defining the welding width at the welding end point 59 are completed and the head 31 is moved to a current start position of the start point 58.

Figure 8C:
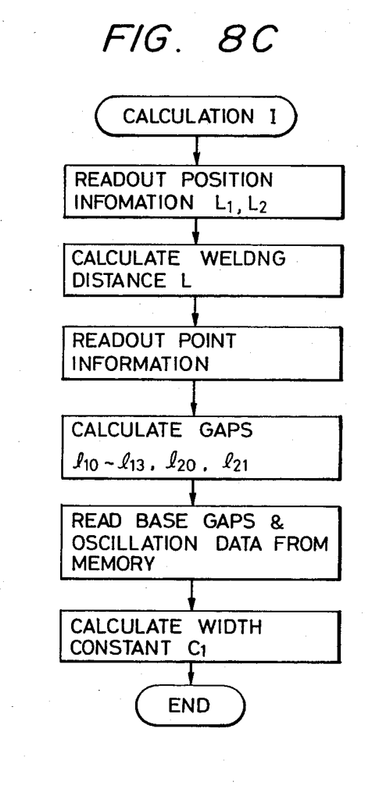

The subsequent operations, shown in FIG. 8C, are the same as those described with reference to FIGS. 4A and 8A.

The automatic welding machine of the invention is constructed as described above. Therefore, even in the case where the groove widths at both ends of the welding line are different from each other, during the welding operation some of the welding conditions are automatically corrected according to the groove width or groove cross-sectional area which varies with the advance of the welding operation. This automatic correction control the amount of deposition. Therefore, the reinforcement of weld is uniform in height, no repair welding operation is required, and complete automation of a welding operation is required, and complete automation of a welding operation can be achieved, according to the invention.

I claim:

1. An automatic welding machine including an oscillating welding head for arc-welding materials which form a welding groove, comprising:

means for providing data descriptive of a configuration of said welding groove at starting and end portions thereof;

means for moving said welding head along said groove to perform a welding operation;

means for determining a present position of said welding head along said groove;

means for calculating a configuration of said groove at said present position of said groove from said data descriptive of said configuration of said groove at said starting and end portions thereof and from said present position of said welding head; and means for correcting welding conditions at said present position in accordance with the calculated configuration of said groove at said present position.

2. The automatic welding machine of claim 1, wherein said welding conditions include an oscillation width of said welding head.

3. The automatic welding machine of claim 1, wherein said welding conditions include a welding speed.

4. The automatic welding machine of claim 1, wherein said welding conditions include a welding current.

5. The automatic welding machine of claim 1, wherein said data descriptive of said configuration of said groove at said starting and end portions comprises data indicative of a depth and width of said groove at said starting and end portions.

6. The automatic welding machine of claim 1, wherein said data descriptive of said configuration of said groove at said starting and end portions comprises data indicative of an angle of said groove.

7. The automatic welding machine of claim 1, wherein said data descriptive of said configuration of said groove at said starting and end portions comprises data indicative of a cross-sectional area of said starting and end portions.

* * * * *